United States Patent

Baumann et al.

(10) Patent No.: US 6,884,485 B2
(45) Date of Patent: Apr. 26, 2005

US006884485B2

(54) MOLDING COMPOSITION BASED ON POLYETHERAMIDES

(75) Inventors: Franz-Erich Baumann, Duelmen (DE); Martin Himmelmann, Haltern (DE); Wilfried Bartz, Marl (DE); Olivier Farges, Marl (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/347,439

(22) Filed: Jan. 21, 2003

(65) Prior Publication Data

US 2003/0162899 A1 Aug. 28, 2003

(30) Foreign Application Priority Data

Jan. 19, 2002 (DE) .......................... 102 01 903

(51) Int. Cl.[7] .................. C08L 77/00; B29D 22/00; B29D 23/00
(52) U.S. Cl. ............... 428/36.92; 428/34.1; 428/35.7; 428/36.9; 525/182; 525/183
(58) Field of Search ............................ 525/182, 183; 428/34.1, 35.7, 36.9, 36.92

(56) References Cited

U.S. PATENT DOCUMENTS

| | | |
|---|---|---|
| 2,146,209 A | 2/1939 | Graves |
| 4,246,374 A | 1/1981 | Kopchik |
| 4,356,300 A | 10/1982 | Isler et al. |
| 5,140,065 A * | 8/1992 | Dalla Torre et al. .......... 525/66 |
| 5,869,414 A | 2/1999 | Fischer et al. |
| 5,959,042 A * | 9/1999 | Bouilloux et al. .......... 525/420 |
| 5,998,545 A * | 12/1999 | Melot et al. ................ 525/178 |

FOREIGN PATENT DOCUMENTS

| | | |
|---|---|---|
| DE | 30 06 961 | 8/1980 |
| EP | 0 095 893 | 12/1983 |
| EP | 0 296 852 | 12/1988 |
| EP | 0 434 244 | 6/1991 |
| EP | 0 476 963 | 3/1992 |
| EP | 0 842 969 | 5/1998 |

OTHER PUBLICATIONS

Hans R. Kricheldorf, "Handbook of Polymer Synthesis", Part A, Verlag Marcel Dekker Inc., New York, Basie, Hong Kong, pp. 223–336.

Hans–Georg Elias, "Macromolecules 2, Synthesis and Materials", pp. 926–927, New York, 1997.

* cited by examiner

*Primary Examiner*—Ana Woodward
(74) *Attorney, Agent, or Firm*—Oblon, Spivak, McClelland, Maier & Neustadt, P.C.

(57) ABSTRACT

A molding composition containing the following components:

I. from 99.9 to 95 parts by weight of a polyetheramide obtained from 1) a linear aliphatic diamine having from 6 to 12 carbon atoms, 2) a linear aliphatic or aromatic dicarboxylic acid having from 6 to 12 carbon atoms, and 3) a polyetherdiamine having at least 3 carbon atoms per ethereal oxygen atom and having a primary amino group at an end of the chain, and II. from 0.1 to 5 parts by weight of a copolymer which contains from 0.8 to 20% by weight of an anhydride or an epoxide in copolymerized form, wherein the total amount of I. and II. is 100 parts by weight, is suitable for the extrusion of flexible pipes, and also for the production of flexible blow-molded articles.

17 Claims, 2 Drawing Sheets

MOLDING COMPOSITION BASED ON POLYETHERAMIDES

BACKGROUND OF THE INVENTION

1. Field of the Invention

The application relates to polyetheramide molding compositions with excellent heat resistance and hydrolysis resistance, suitable for the extrusion of flexible pipes, and also for the production of flexible blow-molded articles.

2. Discussion of the Background

Plasticized semicrystalline polyamide molding compositions, in particular based on nylon-11 or nylon-12, have long been extruded to give pipes for use in automotive construction, because they have excellent mechanical strength and chemical resistance. However, these moldings stiffen after a short period of use at the high usage temperatures increasingly demanded in recent times under the engine hood, due to the volatility of the external plasticizers used. In addition, when exposed to pressure they have a tendency toward irreversible deformation at the increased usage temperatures now demanded which are in the range of from 110 to 150° C. Although these disadvantages can be avoided by using molding compositions based on higher-melting polyetheresteramides, for example as described in EP-A-0 095 893, this class of polyamide elastomer is unsuitable for producing pipes usable for the abovementioned applications, because with respect to the hydrolysis resistance also demanded for this application these molding compositions fall far short of the resistance of traditional polyamide molding compositions, and fail after just a few weeks.

SUMMARY OF THE INVENTION

It is therefore an object of the present invention to provide hydrolysis-resistant molding compositions with high heat resistance which have high melt viscosity and can therefore readily be extruded or blow molded.

It is another object of the present invention to provide moldings from the hydrolysis-resistant molding compositions, the moldings having sufficient, long-lasting flexibility without use of an external plasticizer.

This and other objects have been achieved by the present invention the first embodiment of which includes a molding composition, comprising:

I. from 99.9 to 95 parts by weight of a polyetheramide obtained from 1) a linear aliphatic diamine having from 6 to 12 carbon atoms, 2) a linear aliphatic or aromatic dicarboxylic acid having from 6 to 12 carbon atoms, and 3) a polyetherdiamine having at least 3 carbon atoms per ethereal oxygen atom and having a primary amino group at an end of a chains;

II. from 0.1 to 5 parts by weight of a copolymer which comprises the following units in copolymerized form:

a) from 0 to 85% by weight of

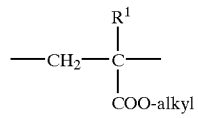

b) from 0 to 80% by weight of

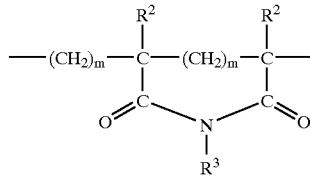

c) from 0 to 15% by weight of

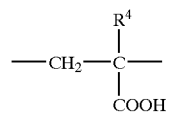

d) from 0.8 to 20% by weight of a unit selected from the group consisting of

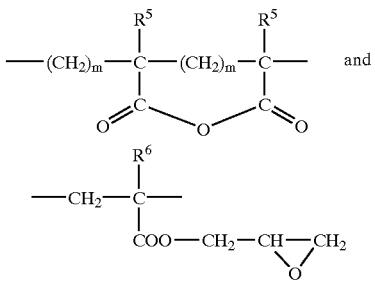

e) from 0 to 95% by weight of

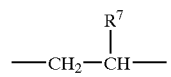

wherein alkyl is methyl, ethyl, propyl, butyl, pentyl or hexyl, $R^1$–$R^7$ are independently H or $C_nH_{2n+1}$, where n=from 1 to 6, or phenyl, and m is 0 or 1, and wherein a sum of the amounts of said polyetheramide and said copolymer is 100 parts by weight.

DETAILED DESCRIPTION OF THE INVENTION

Figure 1:
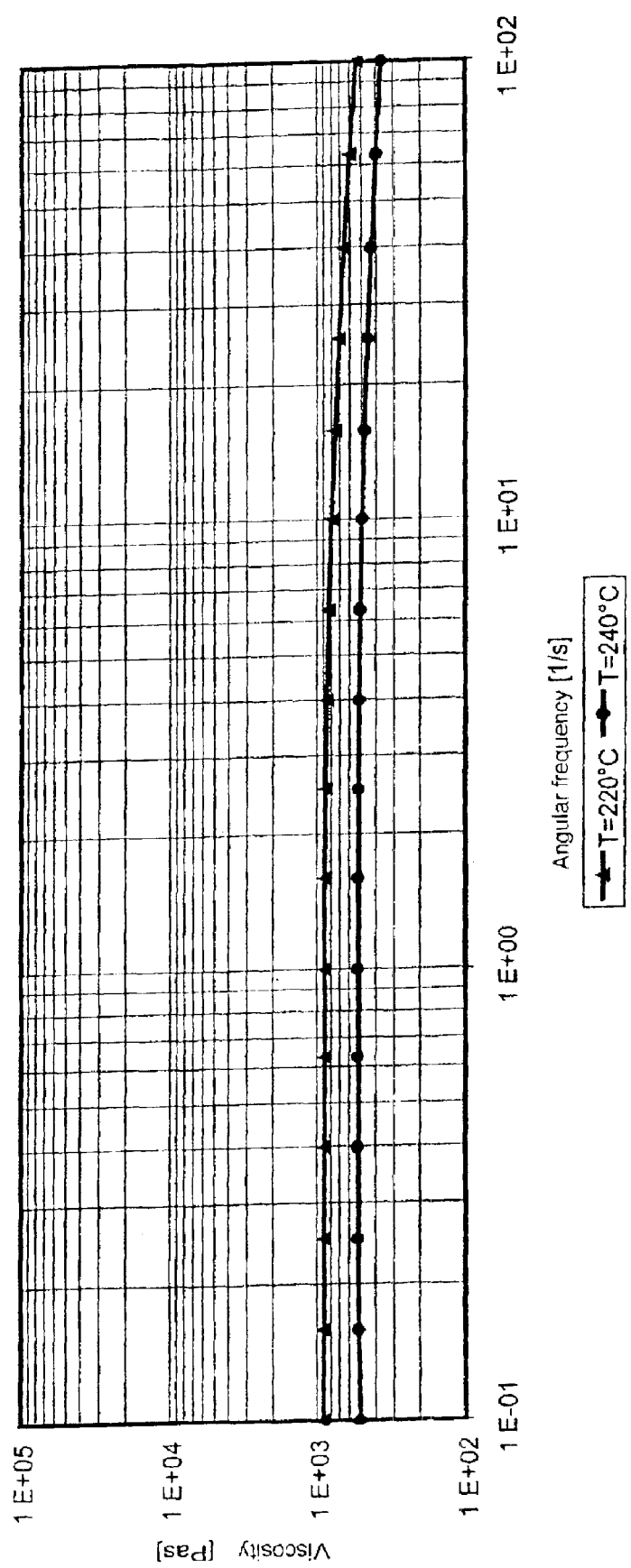
FIG. 1 shows the viscosity curve for the polyetheramide prepared in Example 1.

The present invention provides a molding composition which comprises the following components:

I. from 99.9 to 95 parts by weight of a polyetheramide based on a) a linear aliphatic diamine having from 6 to 12 carbon atoms, b) a linear aliphatic or aromatic dicarboxylic acid having from 6 to 12 carbon atoms, and c) a polyetherdiamine having at least 3 carbon atoms per ethereal oxygen atom and having primary amino groups at the ends of the chains, II. from 0.1 to 5 parts by weight of a copolymer as described in more detail below, wherein the total amount of I. and II. is 100 parts by weight, III. from 0 to 50% by weight, preferably from 0 to 30% by weight, based on the molding composition, of other polymers, and also IV. from 0 to 10% by weight, based on the molding composition, of conventional additives.

The amount of polyetheramide I. includes all values and subvalues therebetween, especially including 95.2, 95.4, 95.6, 95.8, 96, 96.2, 96.4, 96.6, 96.8, 97, 97.2, 97.4, 97.6, 97.8, 98, 98.2, 98.4, 98.6, 98.8, 99, 99.2, 99.4, 99.6 and 99.8 parts by weight. The amount of copolymer II. includes all values and subvalues therebetween, especially including 0.2, 0.4, 0.6, 0.8, 1, 1.2, 1.4, 1.6, 1.8, 2, 2.2, 2.4, 2.6, 2.8, 3, 3.2, 3.4, 3.6, 3.8, 4, 4.2, 4.4, 4.6 and 4.8 parts by weight. The amount of the other polymers III. includes all values and subvalues therebetween, especially including 5, 10, 15, 20, 25, 30, 35, 40 and 45% by weight. The amount of additives includes all values and subvalues therebetween, especially including 2, 4, 6, and 8% by weight.

Polyetheramides are known in principle, e.g. from DE-A 30 06 961. However, the polyetheramides based on caprolactam or laurolactam which are described in more detail in that reference cannot be used because firstly their melting points are too low and secondly their melt viscosities are too low.

The polyetheramides to be used according to the present invention as component I have:

1) a melting point $T_m$ according to ISO 11357 which is preferably at least 160° C. and particularly preferably at least 175° C., 2) a relative solution viscosity $\eta_{rel}$ which is preferably at least 1.80 and particularly preferably at least 1.85, measured in a 0.5% strength by weight solution in m-cresol at 23° C. according to ISO 307, and 3) a zero-shear viscosity at 220° C. which is preferably at least 500 Pas and particularly preferably at least 800 Pas, measured in a mechanical spectrometer (cone-plate) according to ASTM D4440.

The resulting molding composition of the invention has a zero-shear viscosity above 2000 Pas and in particular above 5000 Pas at 220° C., measured in the same way according to ASTM D 4440, because otherwise stable extrusion with retention of dimensions to give the desired pipes or other moldings is impossible, or only possible with temperature latitude which is too narrow for cost-effective manufacture.

The incorporation of the copolymer of component II then leads without difficulty to the desired additional increase in melt viscosity, if the above-mentioned melt viscosities or solution viscosities of the polyetheramides are achieved or exceeded.

Preferred examples of a diamine used in preparing the polyetheramide are 1,6-hexamethylenediamine, 1,8-octamethylenediamine, 1,9-nonamethylenediamine, 1,10-decamethylenediamine, and 1,12-dodecamethylenediamine. Preferred examples of the dicarboxylic acid used are adipic acid, suberic acid, azelaic acid, sebacic acid, 1,12-dodecanedioic acid, terephthalic acid, and 2,6-naphthalenedicarboxylic acid. Preferred polyetherdiamines are obtainable via conversion of the corresponding polyetherdiols through reductive amination, or coupling to acrylonitrile with subsequent hydrogenation (e.g. EP-A-0 434 244; EP-A-0 296 852). They generally have a number-average molecular weight of from 230 to 4000. Their proportion in the polyetheramide is preferably from 5 to 50% by weight. The numbers average molecular weight of the polyetherdiamine includes all values and subvalues therebetween, especially including 250, 500, 750, 1000, 1250, 1500, 1750, 2000, 2250, 2500, 2750, 3000, 3250, 3500 and 3750. The amount of the polyetherdiamine in the polyetheramide I. includes all values and subvalues therebetween, especially including 10, 15, 20, 25, 30, 35, 40, and 45% by weight.

Commercially available polyetherdiamines derived from propylene glycol are available commercially from Huntsman as JEFFAMIN® D grades. In principle, polyetherdiamines derived from 1,4-butanediol or 1,3-butanediol also have good suitability, as have polyetherdiamines of mixed structure, e.g. with random or blocked distribution of the units derived from diols. It is generally desirable for the polyetherdiamines to be used to have a degree of difunctionality of at least 95% and preferably at least 98%, expressed in terms of the molar proportion of acetylatable amino and hydroxy end groups. An amine group content of at least 90% and preferably at least 95% with reference to all acetylatable groups (amino and hydroxy) is desirable, for example as determined acidimetrically. The degree of difunctionality includes all values and subvalues between 95 and 100, especially including 95.5, 96, 96.5, 97, 97.5, 98, 98.5, 99 and 99.5%. The diamine content includes all values and subvalues between 90 and 100, especially including 90.5, 91, 91.5, 92, 92.5, 93, 93.5, 94, 94.5, 95, 95.5, 96, 96.5, 97, 97.5, 98, 98.5, 99 and 99.5%. In view of the high molar masses which have to be achieved, an approximate equivalence between the dicarboxylic acid used and the total of diamine and polyetherdiamine is required. Molar amino:carboxy ratios of from 0.98:1 to 1.02:1 are used in practice. The molar amino to carboxyl ratio includes all values and subvalues therebetween, especially including 0.99:1, 1:1 and 1.01:1.

With a view to the desired build-up of molecular weight, side reactions which adversely affect the end groups or cleave the chains have to be very substantially suppressed. The temperature range for the melt polycondensation is therefore restricted in practice to 220 to about 245° C. The lower limit results from the melting points of the underlying polyamides and the upper limit results from the start of thermal decomposition of the polyetherdiamines. The temperature for melt polycondensation includes all values and subvalues therebetween, especially including 225, 230, 235 and 240° C.

Surprisingly drastic conditions have to be selected for any solid-phase postcondensation which may have to be carried out, whereas experience has shown that temperatures of from 155 to 165° C. are sufficient for aliphatic polyamides, such as nylon-6,12, nylon-10,10, nylon-10,12, or nylon-12, 12, postcondensation temperatures of from 165 to 185° C. are required for the polyetheramides derived from them and used according to the present invention. In order to avoid caking, the solid-phase postcondensation temperature should not be higher than 10 K, preferably 5K below the crystallite melting point $T_m$. The temperature of the solid-phase postcondensation for polyetheramides includes all values and subvalues therebetween, especially including 167, 169, 171, 173, 175, 177, 179, 181 and 183° C. Postcondensation is carried out either under high vacuum or in a stream of inert gas. A possible reason for the relatively low postcondensation activity of the polyetheramides may be that the reactivity of their amino end groups, which are to some extent sterically hindered, is lower than that of conventional amino end groups deriving from aliphatic diamines.

The copolymer contains the following units in copolymerized form:

a) from 0 to 85% by weight, preferably from 0.1 to 80% by weight, of

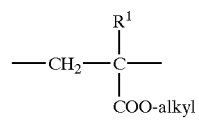

-continued b) from 0 to 80% by weight, preferably from 0.1 to 70% by weight, of

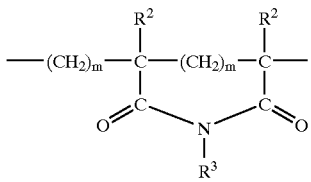

c) from 0 to 15% by weight of

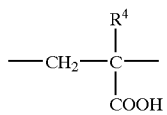

d) from 0.8 to 20% by weight, preferably from 1.2 to 16% by weight, of a unit selected from

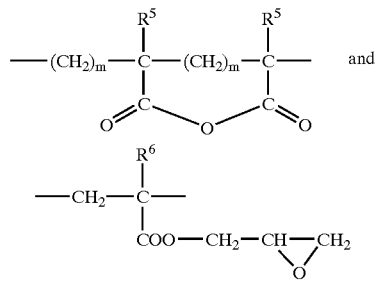

and e) from 0 to 95% by weight, preferably from 0.1 to 85% by weight, of

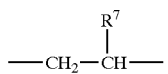

In the formulae specified
alkyl is methyl, ethyl, propyl, butyl, pentyl, or hexyl,
$R^1$ to $R^7$ are each independently H or $C_nH_{2n+1}$, wherein n is from 1 to 6, or phenyl, and
m is 0 or 1,
wherein the radicals $R^1$ to $R^7$ may be identical or different.

The amount of unit a) in the copolymer includes all values and subvalues therebetween, especially including 5, 10, 15, 20, 25, 30, 35, 40, 45, 50, 55, 60, 65, 70, 75 and 80% by weight. The amount of unit b) includes all values and subvalues therebetween, especially including 5, 10, 15, 20, 25, 30, 35, 40, 45, 50, 55, 60, 65, 70 and 75% by weight. The amount of unit c) includes all values and subvalues therebetween, especially including 2, 4, 6, 8, 10, 12 and 14% by weight. The amount of unit d) includes all values and subvalues therebetween, especially including 1, 2, 4, 6, 8, 10, 12, 14, 16 and 18% by weight. The amount of unit e) includes all values and subvalues therebetween, especially including 5, 10, 15, 20, 25, 30, 35, 40, 45, 50, 55, 60, 65, 70, 75, 80, 85 and 90% by weight.

The copolymers are prepared in a known manner by polymerization of the corresponding monomers. In the case where m is 0 and $R^4$ is H, the unit d) derives from maleic anhydride for example, whereas in the case where m is 1, the unit d) results from hydrolysis of two adjacent units of components a) followed by ring closure. Similarly, in the case where m is 0 and $R^2$ is H, the unit b) derives from a maleimide, such as N-phenylmaleimide or N-methylmaleimide, whereas in the case where m is 1, the unit b) results from aminolysis of one unit of the unit a) followed by ring closure via imidization with an adjacent unit of the unit a).

In one preferred embodiment, the amount of the unit b) present is from 10 to 60% by weight, and particularly preferably from 20 to 50% by weight. The amount of unit b) includes all values and subvalues therebetween, especially including 15, 20, 25, 30, 35, 40, 45, 50 and 55% by weight. In the case where m is 1, these polymers are also termed polyglutarimides. These are polyalkyl acrylates in which two adjacent ester groups have been reacted to give a cyclic imide. The imide is preferably formed using ammonia or primary amines, e.g. methylamine. Due to the presence of water during the imide-forming reaction, some of the units a) are hydrolyzed to give the units c) and d). The products, and their preparation, are known (Hans R. Kricheldorf, Handbook of Polymer Synthesis, Part A, Verlag Marcel Dekker Inc. New York, Basle, Hong Kong, pp. 223 et seq.; H. G. Elias, Makromoleküle, Hüthig and Wepf Verlag Basle, Heidelberg, New York; U.S. Pat. No. 2,46,209; U.S. Pat. No. 4,246,374).

Preferred examples of other suitable types of copolymer are those whose structure is based on styrene/maleic anhydride, ethylene/glycidyl methacrylate, ethylene/acrylate/maleic anhydride, or methyl methacrylate/maleic anhydride.

Preferred polymers of component III are primarily those compatible with the polyetheramide, in particular a homopolyolefin, a copolyolefin or a rubber, each bearing functional groups such as carboxylic acid groups, carboxylic anhydride groups, carboxylic ester groups or epoxide groups, or a polyamide. These polymers are state of the art.

Suitable additives of component IV are primarily stabilizers, conductivity black, flame retardants, e.g. melamine cyanurate, pigments, and processing aids. These do not include polymers included in component III.

The copolymers of component II, and also, where appropriate, the additives of components III and IV, are incorporated in the melt with shear, for example in a twin-screw extruder or a co-kneader.

Examples of methods of processing the molding composition of the invention are extrusion, conventional blow molding or 3D blow molding, parison extrusion in an open half of a mold, 3D parison manipulation or 3D suction blow molding, or sequential blow molding to produce hard/soft composites, and any other method of blow molding.

Other methods of processing the molding composition are coextrusion, coextrusion blow molding, coextrusion 3D blow molding, coextrusion suction blow molding, etc., to give a multilayer composite.

The molding composition may also be processed by injection molding, including versions of the process such as GIT (internal gas pressure technique) or WIT (water injection technique).

Preferred examples of products which may be produced by the processes mentioned are monopipes and multilayer pipes. These pipes may be smooth or have corrugation in some regions or throughout. The molding composition is also used for the production of profiles of any type, such as sealing profiles, or hollow articles, e.g. containers.

Preferred examples of uses of the moldings produced according to the invention are in motor vehicle construction, in mechanical engineering and chemical engineering, and in medical technology, in particular as a subatmospheric-pressure line, e.g. for brake servos, an air line, a pressure hose, such as a compressed air line, a control line, a coolant line, a fuel line, a ventilation line, a windshield-wash-system line, a line for hydraulic coupling systems, a servo control line, a line for air-conditioning systems of motor vehicles, a cable sheath or wire sheath, a line for the mechanical or chemical engineering sector, or in medical technology, or an injection-molded part of an oil filter or of a fuel filter. These moldings are likewise provided by the invention.

Having generally described this invention, a further understanding can be obtained by reference to certain specific examples which are provided herein for purposes of illustration only, and are not intended to be limiting unless otherwise specified.

EXAMPLES

Example 1

A 200 l stirred autoclave was charged with the following starting materials:
26.11 kg of hexamethylenediamine in the form of 75% strength aqueous solution,
52.95 kg of 1,12-dodecanedioic acid,
25.55 kg of JEFFAMIN® D400, and
100 g of a 50% strength aqueous solution of hypophosphorous acid.

The starting materials were melted under nitrogen and heated, with stirring, to about 220° C. in the sealed autoclave, the resultant internal pressure being about 20 bar. This internal pressure was retained for 2 hours, and then the melt was heated further to 230° C. with continuous depressurization to atmospheric pressure, and then held for 1.5 hours at this temperature in a stream of nitrogen. The vessel was then evacuated to 28 mbar within a period of 3 hours and held for 3 further hours at this pressure, until the indicated torque showed no further rise in melt viscosity. The melt was then discharged by gear pump and strand-pelletized. The pellets were dried for 24 hours under nitrogen at 80° C.

The properties of the product were as follows:
Crystallite melting point $T_m$: 193° C.,
Relative solution viscosity $\eta_{rel}$: 1.91,
COOH end groups: 21 mmol/kg,
Amino end groups: 26 mmol/kg.

On the basis of the ratio of the monomers used, this polyetheramide formally has a nylon-6,12 block with an average molecular weight of 1083.

50 kg of these pellets were post-condensed for 24 hours at 175° C. jacket temperature under nitrogen (250 l/h) in a tumbling drier of 250 l capacity. After this time, the properties of the product were as follows:
Crystallite melting point $T_m$: 193° C.,
Relative solution viscosity $\eta_{rel}$: 2.06,
COOH end groups: 14 mmol/kg,
Amino end groups: 20 mmol/kg.

Preparation of Molding Composition:

The mixing specification for the molding composition in parts by weight is given below. A Werner & Pfleiderer twin-screw extruder was used to incorporate the individual constituents of the mixing specification at a barrel temperature of 250° C.

TABLE 1

| Mixing specification for the molding composition | |
|---|---|
| Polyetheramide | 95.4 |
| A partially imidated polymethacrylate from Röhm GmbH, Darmstadt, with 54.5% by weight of methyl methacrylate units, 33% by weight of imide units, 2.6% by weight of methacrylic acid units, and 1.2% by weight of anhydride units | 1.9 |
| NAUGARD ® 445 as heat stabilizer | 0.5 |
| CuI-KI stabilizer masterbatch | 1.0 |
| Black color masterbatch based on nylon-6,12; carbon black concentration 20% | 1.2 |

Figure 2:
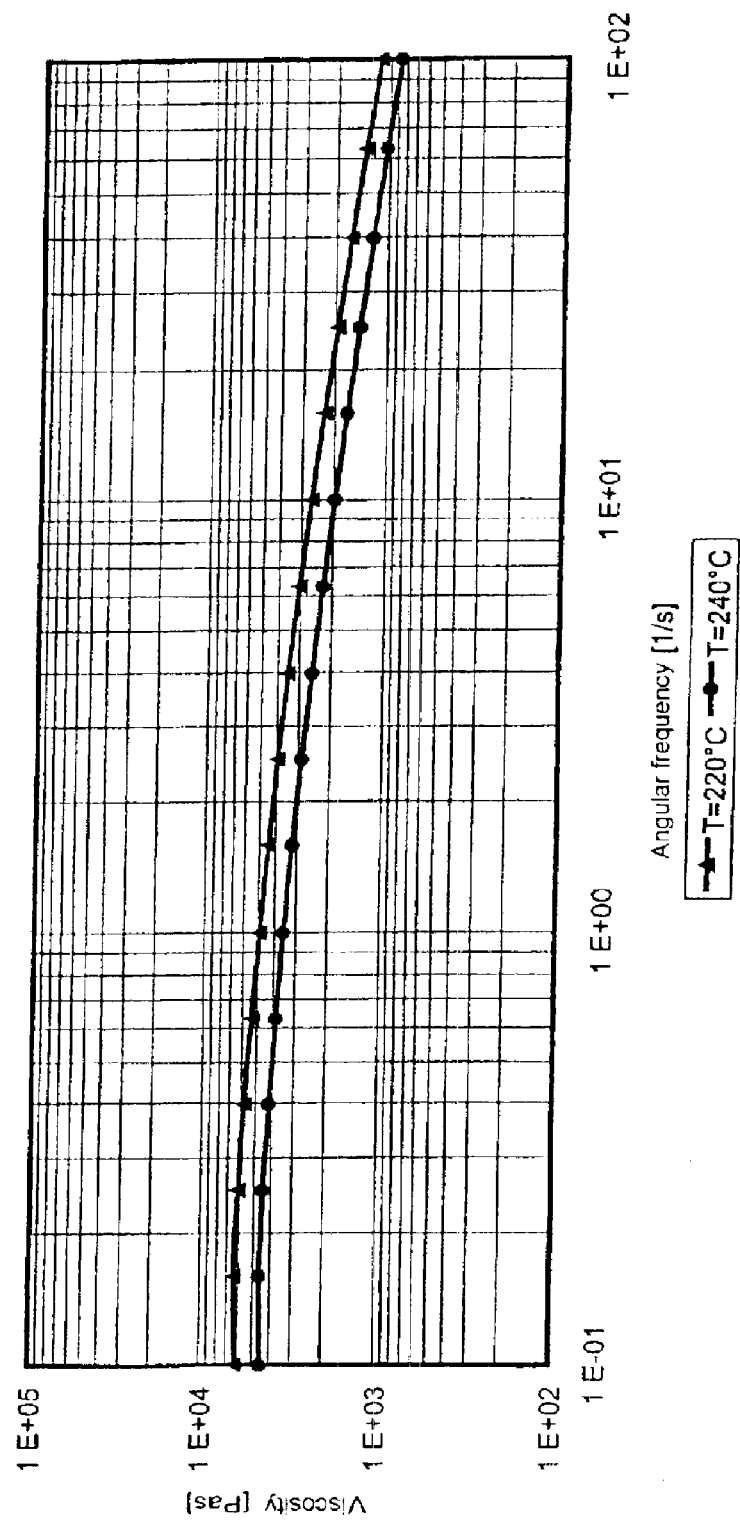
FIG. 2 shows the viscosity curve for the molding composition prepared in Example 1.

FIG. 1 shows the viscosity curve for the polyetheramide prepared in Example 1. FIG. 2 shows the viscosity curve for the molding composition prepared in Example 1.

From these viscosity curves it is clear that the incorporation of a partially imidated polymethacrylate brings about a significant increase in melt viscosity. There is a favorable effect on pseudoplasticity (gradient of viscosity curve) as well as on viscosity level. The two factors are a precondition for cost-effective and stable manufacture of dimensionally correct extruded moldings, such as pipes.

The molding composition of Example 1 was extruded from a commercially available single-screw extruder with 3-zone screw at melt temperature of about 220° C. to give a pipe with external diameter 12 mm and wall thickness 1.25 mm. Two methods were used to test the hydrolysis resistance of this pipe:
a) aging under controlled temperature and humidity conditions at 80° C./95% relative humidity, and
b) full-contact aging in water at 98° C.

For both methods, a tensile test based on ISO 527 was used to determine the change in tensile strength at break.

At the same time, the hydrolysis resistance of corresponding pipes composed of the following materials was tested:
  a prior-art polyetheresteramide molding composition composed of nylon-6,12 blocks with average molecular weight of 1083 and of polytetrahydrofuran blocks derived from a PTHF 650 with an average molecular weight of 649 ($\eta_{rel}$=1.97), comprising the same amounts of NAUGARD® 445, CuI-KI stabilizer masterbatch, and color masterbatch;
  a commercially available thermoplastic polyetherester which can be regarded as prior art for many comparable applications.

The results obtained from aging under controlled temperature and humidity conditions were as follows:
  molding composition from Example 1: tensile strain at break fell from an initial 260% to 232% after 2400 hours.
  Polyetheresteramide: tensile strain at break fell from an initial 337% to 6% after 672 hours.
  Polyetherester: tensile strain at break fell from an initial 339% to 14% after 1344 hours.

The results obtained from full-contact aging were as follows:
  molding composition from Example 1: tensile strain at break fell from an initial 260% to 76% after 2880 hours.
  Polyetheresteramide: tensile strain at break fell from an initial 337% to 0% after 336 hours.
  Polyetherester: tensile strain at break fell from an initial 339% to 0% after 336 hours.

German patent application 10201903.7, filed Jan. 19, 2002, is incorporated herein by reference.

Numerous modifications and variations on the present invention are possible in light of the above teachings. It is therefore to be understood that within the scope of the appended claims, the invention may be practiced otherwise than as specifically described herein.

What is claimed is:
1. A molding composition, comprising:
  I. from 99.9 to 95 parts by weight of a polyetheramide obtained from 1) a linear aliphatic diamine having from 6 to 12 carbon atoms, 2) a linear aliphatic or aromatic dicarboxylic acid having from 6 to 12 carbon atoms, and 3) a polyetherdiamine having at least 3 carbon atoms per ethereal oxygen atom and terminated with primary amino groups and having a zero-shear viscosity at 220° C. of at least 500 Pas.;
  II. from 0.1 to 5 parts by weight of a copolymer which comprises the following units in copolymerized form:

a) from 0 to 85% by weight of $$-CH_2-\underset{\underset{COO-alkyl}{|}}{\overset{\overset{R^1}{|}}{C}}-$$

b) from 0 to 80% by weight of $$-(CH_2)_m-\underset{\underset{O}{\overset{\|}{C}}}{\overset{\overset{R^2}{|}}{C}}-(CH_2)_m-\underset{\underset{O}{\overset{\|}{C}}}{\overset{\overset{R^2}{|}}{C}}-$$
$$\underset{R^3}{\overset{|}{N}}$$

c) from 0 to 15% by weight of $$-CH_2-\underset{\underset{COOH}{|}}{\overset{\overset{R^4}{|}}{C}}-$$

d) from 0.8 to 20% by weight of a unit selected from the group consisting of $$-(CH_2)_m-\underset{\underset{O}{\overset{\|}{C}}}{\overset{\overset{R^5}{|}}{C}}-(CH_2)_m-\underset{\underset{O}{\overset{\|}{C}}}{\overset{\overset{R^5}{|}}{C}}- \quad \text{and}$$
$$\phantom{-(CH_2)_m-}\overset{\phantom{|}}{\phantom{C}}\underset{O}{\phantom{|}}\phantom{-(CH_2)_m-}\overset{\phantom{|}}{\phantom{C}}$$

$$-CH_2-\underset{\underset{COO-CH_2-CH-CH_2}{|}}{\overset{\overset{R^6}{|}}{C}}-$$
$$\phantom{COO-CH_2-CH}\underset{O}{\diagdown\diagup}\phantom{CH_2}$$

e) from 0 to 95% by weight of $$-CH_2-\overset{\overset{R^7}{|}}{CH}-$$

wherein alkyl is methyl, ethyl, propyl, butyl, pentyl or hexyl, $R^1$–$R^7$ are independently H or $C_nH_{2n+1}$, where n=from 1 to 6, or phenyl, and m is 0 or 1, and wherein the sum of the amounts of said polyetheramide (I) and said copolymer (II) is 100 parts by weight, the molding composition having a zero-shear viscosity at 220° C. of at least 2000 Pas.

2. The molding composition as claimed in claim 1, wherein said polyetheramide has a crystallite melting point $T_m$ of at least 160° C.

3. The molding composition as claimed in claim 2, wherein said crystallite melting point $T_m$ is at least 175° C.

4. The molding composition as claimed in claim 1, wherein said polyetheramide has a relative solution viscosity $\eta_{rel}$ of at least 1.80.

5. The molding composition as claimed in claim 4, wherein said relative solution viscosity $\eta_{rel}$ of said polyetheramide is at least 1.85.

6. The molding composition as claimed in claim 1, wherein the zero-shear viscosity of said polyetheramide is at least 800 Pas.

7. The molding composition as claimed in claim 1, wherein the polyetherdiamine component (3) of the polyetheramide (I) has a number-average molecular weight ranging from 230 to 4000.

8. The molding composition as claimed in claim 1, wherein the polyetherdiamine content of the polyetheramide ranges from 5 to 50% by weight.

9. The molding composition as claimed in claim 1, wherein the zero-shear viscosity of said composition at 220° C. is at least 5000 Pas.

10. The molding composition as claimed in claim 1, wherein said copolymer comprises at least 0.1% by weight of unit a) and/or 0.1% by weight of unit b) and/or 0.1% by weight of unit e).

11. The molding composition as claimed in claim 1, wherein said composition comprises not more than 50% by weight, based on the molding composition, of other polymers.

12. The molding composition as claimed in claim 1, wherein said composition comprises not more than 10% by weight, based on the molding composition, of additives.

13. A molding produced from the molding composition as claimed in claim 1.

14. The molding as claimed in claim 13, produced by extrusion, coextrusion, blow molding, 3D blow molding, coextrusion blow molding, coextrusion 3D blow molding, coextrusion suction blow molding, or injection molding.

15. The molding as claimed in claim 13, wherein said molding is a monopipe, a multilayer pipe, a profile, or a hollow article.

16. A molding composition, comprising:

I. from 99.9 to 95 parts by weight of a polyetheramide obtained from 1) a linear aliphatic diamine having from 6 to 12 carbon atoms, 2) a linear aliphatic or aromatic dicarboxylic acid having from 6 to 12 carbon atoms, and 3) a polyetherdiamine having at least 3 carbon atoms per ethereal oxygen atom and terminated with primary amino groups and having a zero-shear viscosity at 220° C. of at least 500 Pas.;

II. from 0.1 to 5 parts by weight of a copolymer which comprises the following units in copolymerized form:

a) from 0 to 85% by weight, preferably from 0.1 to 80% by weight, of $$-CH_2-\underset{\underset{COO-alkyl}{|}}{\overset{\overset{R^1}{|}}{C}}-$$

b) from 0 to 80% by weight, preferably from 0.1 to 70% by weight, of $$-(CH_2)_m-\underset{\underset{O}{\overset{\|}{C}}}{\overset{\overset{R^2}{|}}{C}}-(CH_2)_m-\underset{\underset{O}{\overset{\|}{C}}}{\overset{\overset{R^2}{|}}{C}}-$$
$$\underset{R^3}{\overset{|}{N}}$$

c) from 0 to 15% by weight of $$-CH_2-\underset{\underset{COOH}{|}}{\overset{\overset{R^4}{|}}{C}}-$$

d) from 0.8 to 20% by weight, preferably from 1.2 to 16% by weight, of a unit selected from $$-(CH_2)_m-\underset{\underset{O}{\overset{\|}{C}}}{\overset{\overset{R^5}{|}}{C}}-(CH_2)_m-\underset{\underset{O}{\overset{\|}{C}}}{\overset{\overset{R^5}{|}}{C}}- \quad \text{and}$$

-continued

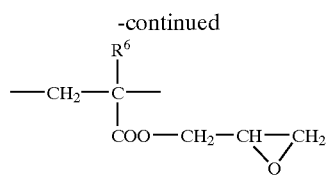

e) from 0 to 95% by weight, preferably from 0.1 to 85% by weight, of

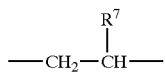

wherein alkyl is methyl, ethyl, propyl, butyl, pentyl or hexyl, $R^1$–$R^7$ are independently H or $C_nH_{2n+1}$, where n=from 1 to 6, or phenyl, and m is 0 or 1, and wherein a the sum of the amounts of said polyetheramide (I) and said copolymer (II) is 100 parts by weight, the molding composition having a zero-shear viscosity at 220° C. of at least 2000 Pas;

wherein said polyetheramide has a relative solution viscosity $\eta_{rel}$ of at least 1.80.

17. The molding as claimed in claim 1, wherein said polyetheramide does not include caprolactam or laurolactam.

* * * * *